United States Patent
Iguchi (10) Patent No.: US 11,114,246 B2
(45) Date of Patent: Sep. 7, 2021

(54) MULTILAYER CERAMIC ELECTRONIC COMPONENT

(71) Applicant: TDK CORPORATION, Tokyo (JP)

(72) Inventor: Toshihiro Iguchi, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 16/281,391

(22) Filed: Feb. 21, 2019

(65) Prior Publication Data

US 2019/0304693 A1    Oct. 3, 2019

(30) Foreign Application Priority Data

Mar. 27, 2018    (JP) .............................. JP2018-060363

(51) Int. Cl.
| | |
|---|---|
| *H01G 4/255* | (2006.01) |
| *H01G 4/008* | (2006.01) |
| *H01G 4/30* | (2006.01) |
| *H01G 4/12* | (2006.01) |
| *H01G 4/012* | (2006.01) |
| *H01G 4/232* | (2006.01) |

(52) U.S. Cl.
CPC ........... *H01G 4/255* (2013.01); *H01G 4/0085* (2013.01); *H01G 4/1209* (2013.01); *H01G 4/1227* (2013.01); *H01G 4/30* (2013.01); *H01G 4/1245* (2013.01); *H01G 4/2325* (2013.01)

(58) Field of Classification Search
CPC ............ H01G 4/005; H01G 4/30; H01G 4/12; H01G 4/12276; H01G 4/1209; H01G 4/012; H01G 4/0085; H01G 4/255; H01G 4/1227

USPC ......... 361/321.1, 321.2, 301.4, 306.1, 321.3, 361/311, 320

See application file for complete search history.

(56) References Cited

U.S. PATENT DOCUMENTS

| | | | |
|---|---|---|---|
| 2008/0068777 A1* | 3/2008 | Takeoka | C04B 35/4682 361/321.4 |
| 2013/0208399 A1* | 8/2013 | Morita | H01G 4/12 361/301.4 |
| 2014/0063685 A1 | 3/2014 | Lee et al. | |
| 2016/0163453 A1* | 6/2016 | Ikeda | H01G 4/012 361/301.4 |
| 2018/0061574 A1 | 3/2018 | Kitamura et al. | |

FOREIGN PATENT DOCUMENTS

| | | | | |
|---|---|---|---|---|
| CN | 101377980 A | | 3/2009 | |
| CN | 107785168 A | | 3/2018 | |
| JP | 2007142342 A | * | 6/2007 | ............... H01G 4/12 |
| JP | 2014-053589 A | | 3/2014 | |

* cited by examiner

*Primary Examiner* — Arun Ramaswamy
(74) *Attorney, Agent, or Firm* — Oliff PLC (57) ABSTRACT

A multilayer ceramic electronic component includes an element body. The element body includes a capacitance region and an exterior region. The capacitance region is formed by alternately laminating inner dielectric layers and internal electrode layers having different polarities. The exterior region is laminated outside the capacitance region in a laminating direction and formed by outer dielectric layers. The internal electrode layers contain a main component of copper and/or silver. An exterior void ratio is larger than a capacitance void ratio, in which the exterior void ratio is an area ratio of voids contained in the exterior region, and the capacitance void ratio is an area ratio of voids contained in the capacitance region.

7 Claims, 3 Drawing Sheets

MULTILAYER CERAMIC ELECTRONIC COMPONENT

BACKGROUND OF THE INVENTION

The present invention relates to a multilayer ceramic electronic component such as a multilayer ceramic capacitor.

For example, as described in Patent Document 1, known is a multilayer ceramic capacitor including dielectric layers made mainly of barium titanate and internal electrode layers made mainly of nickel. Such a multilayer ceramic capacitor is used for many applications. It is then considered that less voids are better in an element body formed by a multilayer body of dielectric layers and internal electrode layers.

Patent Document 1: Japanese Patent Laid-Open No. 2014-053589

BRIEF SUMMARY OF INVENTION

However, the present inventor has found that when an electric current passes through a capacitor (particularly, a multilayer ceramic capacitor having internal electrode layers made mainly of nickel) after a short-circuit is generated by, for example, high voltage or mechanical stress, the capacitor may be feverish and thereby heat a mounting substrate.

The present invention has been achieved under such circumstances. It is an object of the invention to provide a multilayer ceramic electronic component, such as a multilayer ceramic capacitor, capable of maintaining insulation properties even if an electric current passes through a capacitor after a short-circuit is generated by, for example, high voltage or mechanical stress.

To achieve the above-described object, a multilayer ceramic electronic component according to the present invention includes an element body including:

a capacitance region formed by alternately laminating inner dielectric layers and internal electrode layers having different polarities; and an exterior region laminated outside the capacitance region in a laminating direction and formed by outer dielectric layers, wherein the internal electrode layers contain a main component of copper and/or silver, and an exterior void ratio is larger than a capacitance void ratio, in which the exterior void ratio is an area ratio of voids contained in the exterior region, and the capacitance void ratio is an area ratio of voids contained in the capacitance region.

In the multilayer ceramic electronic component according to the present invention, the internal electrode layers contain a main component of copper and/or silver, and an exterior void ratio is larger than a capacitance void ratio, in which the exterior void ratio is an area ratio of voids contained in the exterior region, and the capacitance void ratio is an area ratio of voids contained in the capacitance region.

Since such conditions are satisfied, the multilayer ceramic electronic component according to the present invention can restore insulation properties (self-repairing properties) by passing an electric current through the electronic component after a short-circuit is generated by, for example, high voltage or high electric current. Thus, insulation is secured even if an electric current passes through the short-circuited electronic component once again, and the multilayer ceramic electronic component according to the present invention is thereby unlikely to be feverish.

Incidentally, the following reason is conceivable for why insulation is recovered by flowing an electric current once again through the short-circuited multilayer ceramic capacitor. That is, insulation is conceivably recovered in such a manner that when the above-mentioned conditions are satisfied, an electric current flows once again through a portion where the internal electrode layers are short-circuited, and the internal electrodes are thereby melted and scattered. It is also conceivable that if the exterior void ratio is larger than the capacity void ratio, the heat in the capacity region is not easily transmitted to the outside, and self-repairing is thereby easy to occur.

Preferably, the element body further includes a leading region formed by an insulator located between the internal electrode layers having the same polarity and led from the capacitance region, and a leading void ratio is larger than the capacitance void ratio, in which the leading void ratio is an area ratio of voids contained in the leading region. In this structure, heat is harder to transmit except for the capacitance region, and self-repairing thereby occurs more easily.

Preferably, the element body further includes a side region formed by an insulator located on a side part of the capacitance region and covering side surfaces of the internal electrode layers, and a side void ratio is larger than the capacitance void ratio, in which the side void ratio is an area ratio of voids contained in the side region. In this structure, heat is harder to transmit except for the capacitance region, and self-repairing thereby occurs more easily.

Preferably, the dielectric layers (at least the inner dielectric layers (preferably, the same applies to the outer dielectric layers)) include a main component containing barium titanate and a sub-component containing boron oxide and/or lithium oxide. In this structure, dielectrics can be sintered at low temperature, and a multilayer ceramic electronic component having internal electrode layers of Cu can easily be manufactured.

Preferably, the internal electrode layers contain dielectric particles containing a main component of barium titanate. In this structure, insulation properties are easily recovered after short-circuit.

Preferably, the internal electrode layers also contain voids. In this structure, insulation properties are easily recovered after short-circuit.

DETAILED DESCRIPTION OF INVENTION

The present invention is described below with reference to embodiments illustrated in the figures.

First Embodiment

Overall Configuration of Multilayer Ceramic Capacitor

An overall configuration of a multilayer ceramic capacitor is described as an embodiment of a multilayer ceramic electronic component of the present invention.

Figure 1A:
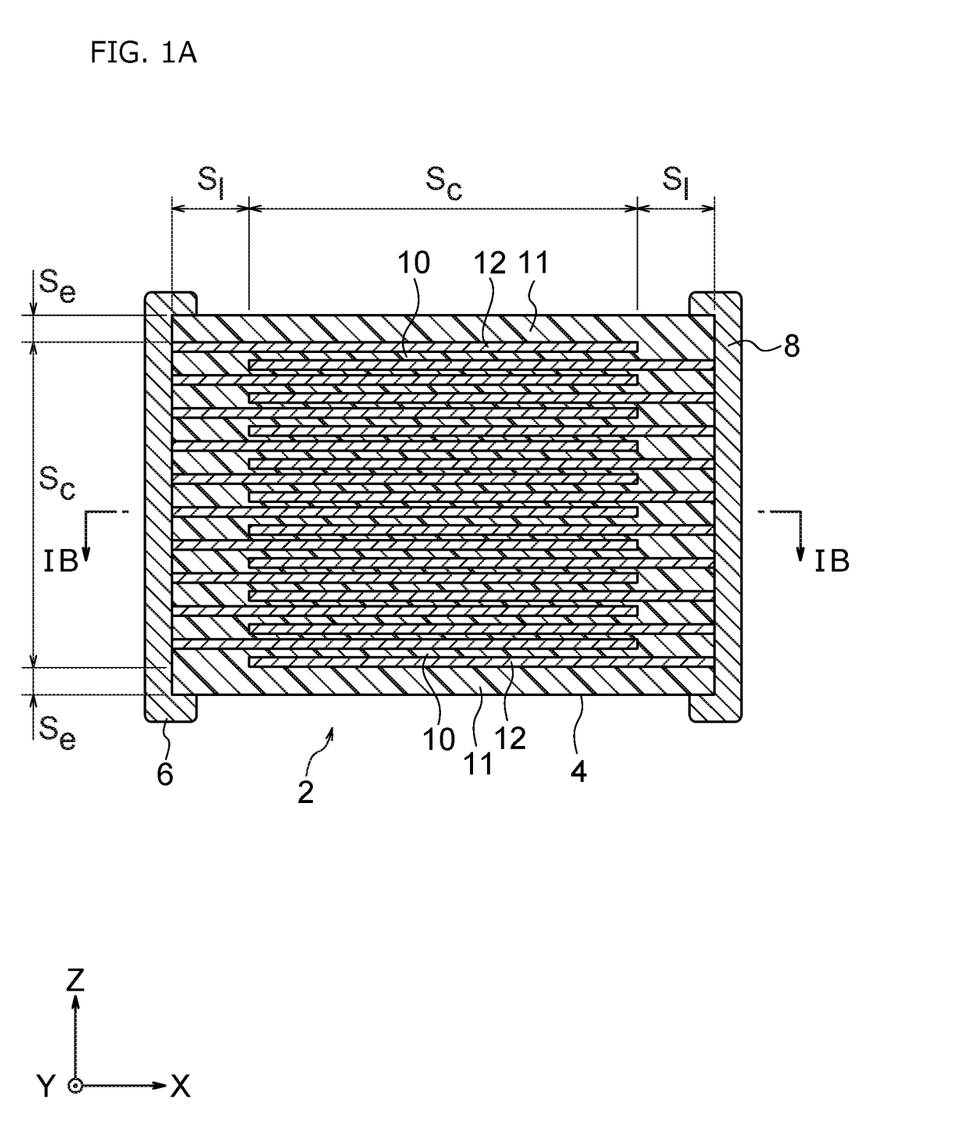
FIG. 1A is a schematic cross-sectional view of a multilayer ceramic capacitor according to an embodiment of the present invention.
Figure 1B:
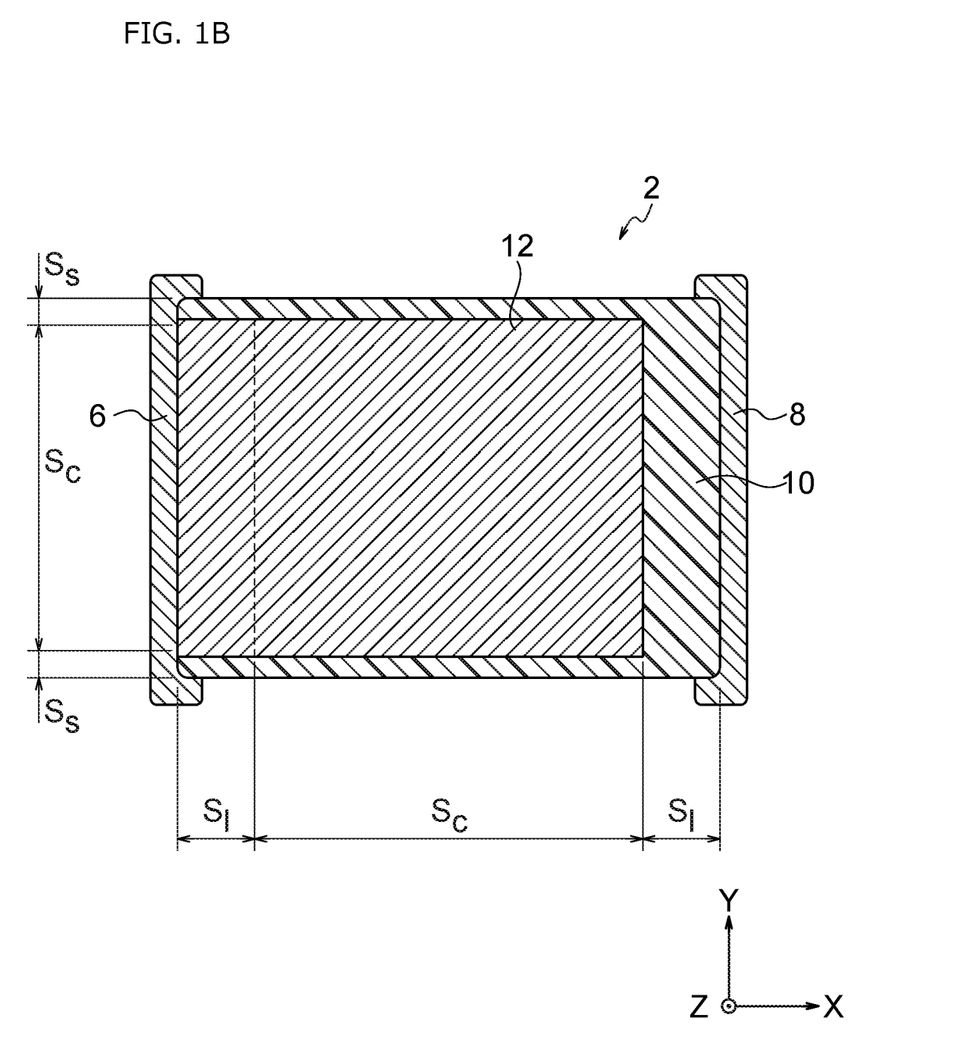
FIG. 1B is a schematic cross-sectional view along the IB-IB line shown in FIG. 1A.

As shown in FIG. 1, a multilayer ceramic capacitor 2 according to the embodiment includes a capacitor element body 4, a first terminal electrode 6, and a second terminal electrode 8. The capacitor element body 4 includes inner dielectric layers 10 and internal electrode layers 12, and the internal electrode layers 12 are laminated alternately between the inner dielectric layers 10.

A portion where the inner dielectric layers 10 and the internal electrode layers 12 are laminated alternately corresponds to an interior region (capacity region) Sc. The capacitor element body 4 includes exterior regions Se on both end surfaces in a laminating direction Z (Z-axis) thereof. The exterior regions Se are made of outer dielectric layers 11, which are thicker than the inner dielectric layers 10 constituting the interior region Sc.

The internal electrode layers 12 alternately laminated on one side are electrically connected to the inner side of the first terminal electrode 6 formed outside a first end portion of the capacitor element body 4 in the X-axis direction. The internal electrode layers 12 alternately laminated on the other side are electrically connected to the inner side of the second terminal electrode 8 formed outside a second end portion of the capacitor element body 4 in the X-axis direction.

The element body 4 further includes leading regions Sl formed by an insulator located between the internal electrode layers 12 having the same polarity respectively led from the capacity region Sc to both sides in the X-axis direction. As shown in FIG. 1B, the element body 4 also includes side regions Ss formed by an insulator located on both sides of the capacity region Sc in the Y-axis direction and covering both side surfaces of the internal electrode layers 12. In the present embodiment, all of the insulator in the leading regions Sl, the insulator in the side regions Ss, and the inner dielectric layers 10 in the capacity region Sc are composed of the same dielectric material, but may be composed of different dielectric materials as shown in the following different embodiments.

The inner dielectric layers 10 constituting the capacity region Sc and the outer dielectric layers 11 constituting the exterior regions may be made of the same material or different materials and are made of, for example, a perovskite-type insulator material of $ABO_3$, where A is at least one of Ca, Ba, Sr, etc., and B is at least one of Ti, Zr, etc. A molar ratio of A/B is not limited and is 0.980 to 1.200.

Particularly preferably, the inner dielectric layers 10 include a main component containing barium titanate (Ba-$TiO_3$) and a sub-component containing boron oxide and/or lithium oxide. An example of boron oxide is $B_2O_3$. An example of lithium oxide is $Li_2O$.

Barium titanate (main component) is represented by, for example, a composition formula of $Ba_mTiO_{2+m}$. In the composition formula, m satisfies $0.995 \leq m \leq 1.100$, and a ratio of Ba to Ti satisfies $0.995 \leq Ba/Ti \leq 1.100$.

2.5 to 20 mol of boron oxide (sub-component) to 100 mol of barium titanate (main component) is preferably contained in the dielectric layers 10 in terms of $B_2O_3$. Alternatively, 2.5 to 20 mol of lithium oxide (sub-component) to 100 mol of barium titanate (main component) is preferably contained in the dielectric layers 10 in terms of $Li_2O_3$.

For example, other sub-components that may be contained in the dielectric layers 10 are at least one of MgO, CaO, SrO, and BaO, at least one of $SiO_2$ and $Al_2O_3$, at least one of MnO, $Cr_2O_3$, and $V_2O_5$, at least one of R oxide ($R_2O_3$)(Y, La, Ce, Pr, Nd, Sm, Eu, Gd, Tb, Dy, Ho, Er, Tm, Yb, and Lu), or the like. For example, these other sub-components of 0 to 10 mol (preferably, 1 to 5 mol) may be contained to barium titanate of 100 mol.

The internal electrode layers 12 contain a main component of copper (Cu) and/or silver (Ag). Containing a main component of (Cu) and/or silver (Ag) means that an alloy containing these metals may be contained as a main component. Moreover, containing a main component means that a proportion of copper, silver, or a copper-silver alloy contained in the internal electrode layers 12 is 80 wt % or more. The internal electrode layers 12 may contain elements other than copper, silver, or the copper-silver alloy.

The alloy containing copper (Cu) and/or silver (Ag) may be any alloy, such as Ag—Pd alloy.

The terminal electrodes 6 and 8 are made of any materials, but may normally be made of at least one of Ni, Pd, Ag, Au, Cu, Pt, Rh, Ru, Ir, etc., or an alloy of these elements. The terminal electrodes 6 and 8 are normally made of Cu, Cu alloy, Ni, Ni alloy, Ag, Pd. Ag—Pd alloy, Ag—Pd—Cu alloy, or the like. Each of the terminal electrodes 6 and 8 may be composed of multilayer electrodes.

For example, each of the terminal electrodes 6 and 8 may include a three-layer structure of a copper paste baked electrode film, a nickel plated film, and a zinc plated film or a two-layer structure of a copper paste baked electrode film and a baked electrode film containing a main component of silver, from the inner side in contact with the element body 4. Alternatively, each of the terminal electrodes 6 and 8 may include a resin electrode film made of a resin acrd metal particles.

The shape and the size of the multilayer ceramic capacitor 2 are determined as appropriate according to the object and the application. When the multilayer ceramic capacitor 2 has a cuboid shape, the length in the X-axis direction is normally 0.4 mm to 5.7 mm, but the length in the X-axis direction is preferably 1.0 mm to 4.5 mm in the present embodiment.

The height (length in the Z-axis direction) of the multilayer ceramic capacitor 2 varies depending on the number of laminated layers in the inner dielectric layers 10 and the internal electrode layers 12 and is normally 0.2 mm to 3.2 mm, but is preferably 0.5 to 2.5 mm in the present embodiment. The multilayer ceramic capacitor 2 normally has a length of 0.2 mm to 5.0 mm in the Y-axis direction, but preferably has a length of 0.2 mm to 2.5 mm in the Y-axis direction in the present embodiment.

In FIG. 1A, the thickness of the terminal electrodes 6 and 8 is illustrated to be thicker than the actual thickness for the sake of simple illustration, but the actual thickness of the terminal electrodes 6 and 8 is respectively on the order of 10 μm to 50 μm, which is extremely thinner than the length in the X-axis direction. In the figures, the X-axis, the Y-axis, and the Z-axis are perpendicular to each other, the Z-axis corresponds to the laminating direction of the inner dielectric layers 10 and the internal electrode layers 12, and the X-axis direction corresponds to a direction where the terminal electrodes 6 and 8 face each other.

The thickness of each of the inner dielectric layers 10 is normally several μm to several tens of μm, but is preferably 0.5 μm to 20 μm in the present embodiment. The thickness of the internal electrode layers 12 is preferably 0.7 μm to 3 μm.

Figure 2:
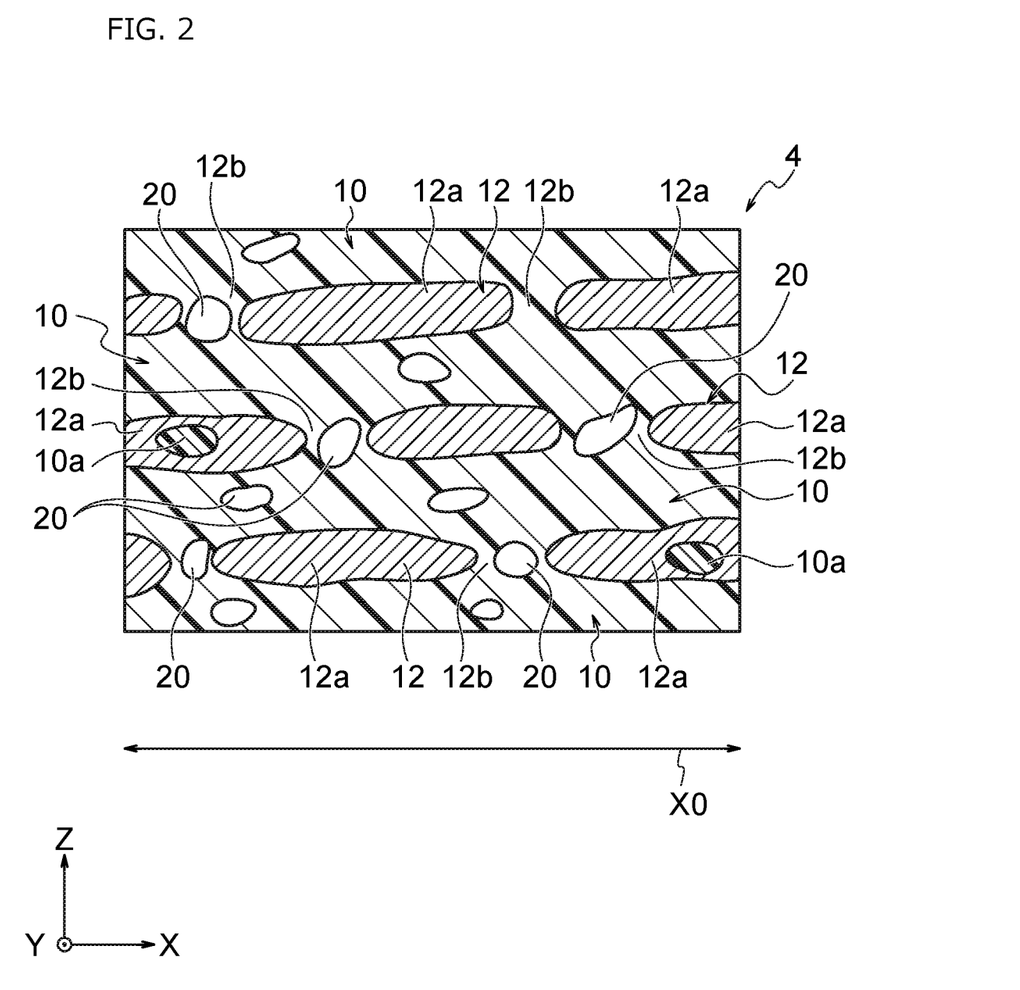
FIG. 2 is a schematic view of an enlarged cross-sectional photograph of a multilayer structure of internal electrode layers and dielectric layers in the capacitor shown in FIG. 1A.

In the present embodiment, when a picture of a cross section (a cross section parallel to the Z-axis) of the capacitor 2 shown in FIG. 1 is taken as shown in FIG. 2, the following characteristics appear on the cross section of the internal electrode layers 12 within an imaging range of (10 to 50 μm)×(10 to 50) μm, for example. That is, each of the internal electrode layers 12 does not continue over the entire plane of the X-axis and the Y-axis in the cross section, but includes electrode-present areas 12a appearing intermittently via a plurality of electrode-absent areas 12b. In the electrode-present areas 12a, conductive particles constituting the internal electrode layers 12 continue in a plane direction of the X-axis and the Y-axis.

In the present embodiment, when the element body 4 is cut in a direction substantially perpendicular to the internal electrode layers 12 so as to observe a cut surface, the electrode-present areas 12a and the electrode-absent areas 12b are arranged alternately in a predetermined length X0 along a longitudinal direction, and at least two of the electrode-absent areas 12b are provided, in the internal electrode layers 12. The predetermined length X0 is not limited, but is preferably within 50 μm.

In the cut surface, the electrode-absent areas 12b appear intermittently in the longitudinal direction of the internal electrode layers 12 and do not contain the conductive particles. The electrode-absent area 12b includes an area where adjacent dielectric layers are connected by dielectric particles constituting the dielectric layers 10 and an area where voids 20 (neither the dielectric particles nor the conductive particles exist) exist. Incidentally, the voids 20 also exist in the dielectric layers 10. The internal electrode layers 12 may contain dielectric particles 10a.

In each of the internal electrode layers 12, the electrode-absent areas 12b are not formed continuously in the X-axis direction, the Y-axis direction, or in a plane direction therebetween, but appear like islands in a plane (X-Y axes plane) of each of the internal electrode layers 12. Thus, the electrode-present areas 12a of each of the internal electrode layers 12 are connected in any transverse cross section (cut surface) and are continuous in the X-axis direction and the Y-axis direction as a whole as shown in FIG. 1. A width of each of the electrode-absent areas 12b in the X-axis direction or in the Y-axis direction (or a width in the intermediate direction between the X-axis and the Y-axis) is about 1 to 10 times larger than a thickness of each of the internal electrode layers 12.

In the present embodiment, an exterior void ratio RSe is larger than a capacity void ratio RSc on a transverse cross section of the element body 4 as shown in FIG. 2, where the exterior void ratio RSe is an area ratio of the voids 20 (see FIG. 2) contained in the exterior regions Se shown in FIG. 1A, and the capacity void ratio RSc is an area ratio of the voids 20 (see FIG. 2) contained in the capacity region Sc. RSe/RSc is larger than 1 (preferably, 1.1 to 2). When RSe/RSe is too small, the advantageous effect of the present embodiment is small. When RSe RSc is too large, the capacity region Sc may not be protected sufficiently by the exterior regions Se.

The exterior void ratio RSe is obtained by observing freely selected nine cross sections in the exterior regions Se shown in FIG. 1A (cross-sectional view of 50 μm×50 μm each), obtaining area ratios of the voids 20 shown in FIG. 2 in the respective cross-sectional views, and obtaining an average of the obtained area ratios. The capacity void ratio RSc is obtained by observing freely selected nine cross sections in the capacity region Sc shown in FIG. 1A (cross-sectional view of 50 μm×50 μm each), obtaining area ratios of the voids 20 shown in FIG. 2 in the respective cross-sectional views, and obtaining an average of the obtained area ratios. In the capacity region Sc, the voids 20 appear both in the dielectric layers 10 and the internal electrode layers 12. In the exterior regions Se, however, the voids 20 appear only in the dielectric layers 11.

The present inventor has earnestly studied electronic components, such as multilayer ceramic capacitor 2, and consequently found that when the following conditions are satisfied, insulation properties can be restored by passing an electric current between the terminal electrodes 6 and 8 of the multilayer ceramic capacitor 2 after a short-circuit is generated by, for example, high voltage or mechanical stress. Then, the present invention has been accomplished. That is, the internal electrode layers 12 of the present embodiment contain a main component of copper or silver. In addition, an exterior void ratio RSe is larger than a capacity void ratio RSc on a transverse cross section of the element body 4, where the exterior void ratio RSe is an area ratio of the voids 20 contained in the exterior regions Se, and the capacity void ratio RSc is an area ratio of the voids 20 contained in the capacity region Sc. That is, RSe/RSc is larger than 1.

Since such conditions are satisfied, the multilayer ceramic electronic component 2 according to the present embodiment can restore insulation properties by passing an electric current (by rated voltage) between the terminal electrodes 6 and 8 of the multilayer ceramic capacitor 2 after a short-circuit is generated by, for example, high voltage or mechanical stress. Thus, insulation is secured even if an electric current passes through the short-circuited multilayer ceramic capacitor 2 oncee again, and the multilayer ceramic capacitor 2 is thereby unlikely to be feverish.

Incidentally, the following reason is conceivable for why insulation is recovered by flowing an electric current once again through the short-circuited multilayer ceramic capacitor 2. That is, insulation is conceivably recovered in such a manner that when the above-mentioned conditions are satisfied, an electric current flows once again through a portion where the internal electrode layers 12 are short-circuited, and the internal electrode layers 12 are thereby melted and scattered. It is also conceivable that if the exterior void ratio RSe is larger than the capacity void ratio RSc, the heat in the capacity region Sc is not easily transmitted to the outside, and self-repairing is thereby easy to occur.

Any voltage is selected for a high voltage that causes the short-circuit, but this high voltage is 2.5 times or higher than a rated voltage (10V to 630V) of the multilayer ceramic capacitor 2.

In the present embodiment, as shown in FIG. 2, two to ten electrode-absent areas 12b preferably exist (more preferably, two to five electrode-absent areas 12b) in the internal electrode layers 12 within a predetermined length X0 in the longitudinal direction. In this structure, insulation is easily recovered after short-circuit, and initial capacitance (capacitance before short-circuit) is large.

In the present embodiment, the number of the electrode-absent areas 12b in the predetermined length X0 in the longitudinal direction (the X-axis direction, the Y-axis direction, or the intermediate direction therebetween) of the outermost internal electrode layers 12 in the laminating direction (Z-axis direction) is larger than that of the center portion of the internal electrode layers 12 in the laminating direction shown in FIG. 1. For example, Ec/Ee is preferably smaller than 1 (more preferably, 0.2 to 0.8), where Ec is the number of the electrode-absent areas in the center portion of the laminating direction, and Ee is the number of the electrode-absent areas in the outermost layer of the laminating direction.

The internal electrode layers 12 are more easily short-circuited at the outermost layer in the laminating direction than at the center portion in the laminating direction. Thus, insulation can easily be recovered on the outermost layer in the laminating direction by increasing the number of the electrode-absent areas in the internal electrode layers 12 on the site. In the internal electrode layers 12 located in the center portion in the laminating direction, the initial capacitance can be increased by comparatively reducing the number of the electrode-absent areas.

In the present embodiment, the electrode-present areas 12a of the internal electrode layers 12 contain the dielectric particles 10a containing a main component of barium titanate as shown in FIG. 2. In this structure, insulation properties are easily recovered after the short-circuit. In the present embodiment, the electrode-absent areas 12b of the internal electrode layers 12 contain the voids 20. In this structure, insulation properties are easily recovered after the short-circuit. In the present embodiment, the voids 20 are also contained in the dielectric layers 10.

The voids 20 have any size, but preferably have a cross-section-converted diameter of 0.2 μM to 3 μm. Incidentally, the cross-section-converted diameter is a diameter of a circle having a cross-sectional area equivalent to a measured cross-sectional area of the voids 20 on the cross section.

In the present embodiment, an area ratio of the voids 20 contained in the internal electrode layer 12 on the outermost layer in the laminating direction is larger than that in the center portion of the internal electrode layers 12 in the laminating direction. For example, Vc/Ve is preferably smaller than 1 (more preferably, 0.2 to 0.8), where Vc is an area ratio of the voids 20 with respect to an area of the internal electrode layers 12 in the center portion in the laminating direction, and Ve is an area ratio of the voids 20 with respect to an area of the internal electrode layer 12 on the outermost layer in the laminating direction. In this structure, insulation properties are easily recovered after the short-circuit. This is probably because heat is not easily dispersed outward from the element body 4 if the voids contained in the internal electrode layers 12 on the outermost layer in the laminating direction have a large area ratio.

In the present embodiment, it is particularly preferred that an amount of boron (Bs) contained in the dielectric layers 10 located near the outer surface of the element body 4 shown in FIG. 1 is preferably smaller than an amount of boron (Be) contained in the dielectric layers 10 located at a central portion of the element body 4. In this structure, a deflection strength or a crack strength of the multilayer ceramic capacitor 2 is improved because, among others, a joint strength between the terminal electrodes 6 and 8 and the element body 4 is improved, and defects such as lowering of the strength of the outer surface due to a reaction of boron contained in the outer surface with moisture in the air are likely to be reduced. Preferably, the content ratio Bs/Bc is 0.5 to 0.95. To adequately control the content ratio Bs/Bc, controlled are a debinding time, a firing time, an annealing time, etc. of the element body 4. The longer these times are, the smaller the content ratio Bs/Bc tends to be.

Method of Manufacturing Multilayer Ceramic Capacitor

Next, a method of manufacturing the multilayer ceramic capacitor 2 is described as an embodiment of the present invention.

A paste for inner green sheets and a paste for outer green sheets are initially prepared so as to manufacture inner green sheets, which will constitute the inner dielectric layers 10 shown in FIG. 1 after firing, and outer green sheets, which will constitute outer dielectric layers of the exterior regions.

The paste for inner green sheets and the paste for outer green sheets are normally made of an aqueous paste or an organic-solvent-based paste obtained by kneading a ceramic powder with an organic vehicle.

A raw material of the ceramic powder nay be selected as appropriate from various compounds such as composite oxide and an oxide, for example, from a carbonate, a nitrate, a hydroxide, an organometallic compound and the like, which constitutes the above-described dielectric layers 10 and 11, and these various compounds can be mixed for use. In the present embodiment, the raw material of the ceramic powder used is preferably a powder having an average grain size of about 0.01 to 1 μm. To obtain an extremely thin inner green sheet, preferably used is a powder that is finer than the thickness of the green sheet.

The organic vehicle is an organic solvent in which a binder is dissolved. The binder used for the organic vehicle may be any binder and be selected appropriately from normally used various binders, such as acrylic and ethyl cellulose.

The organic solvent to be used may be any solvent and be selected from various organic solvents, such as terpineol, butyl carbitol, alcohol, methyl ethyl ketone, acetone, and toluene, depending on the method to be used (e.g., printing method and sheet method).

If necessary, the paste for green sheets may be added with an additive selected from various dispersants, plasticizes, dielectrics, sub-component chemical compound, glass frit, insulators, and the like.

Examples of the plasticizer include phthalic acid esters (e.g., dioctyl phthalate and benzylbutyl phthalate), adipic acid, phosphoric esters, and glycols.

Subsequently prepared is a paste for internal electrode pattern layers for forming the internal electrode layers 12 shown in FIG. 1. The paste for internal electrode pattern layers is prepared by kneading the above-described organic vehicle with conductive materials made of the above-described various conductive metals or alloys, various oxides to be a conductive material after firing, organic metal compounds, resinate, or the like. If necessary, the paste for internal electrode pattern layers may contain an inhibitor of ceramic powder (e.g., barium titanate powder). The inhibitor prevents the conductive powder from being sintered in the firing step.

Using the paste for inner green sheets and the paste for internal electrode pattern layers adjusted in the above-described step, the inner green sheets serving as the inner dielectric layers 10 after firing and the internal electrode pattern layers serving as the internal electrode layers 12 after firing are laminated alternately to manufacture an internal multilayer body serving as the interior region after firing as shown in FIG. 1. After or before the internal multilayer body is manufactured, outer green sheets serving as the outer dielectric layers in the exterior regions after firing is formed using the paste for outer green sheets.

Specifically, the inner green sheets are formed on carrier sheets (e.g. PET film) as a support by a doctor blade method or so. The inner green sheets are dried after having been formed on the carrier sheets.

Next, the internal electrode pattern layers are formed on the surface of the inner green sheets formed in the above step using the paste for internal electrode pattern layers, and inner green sheets having the internal electrode pattern layers are obtained. Then, the obtained inner green sheets each having the internal electrode pattern layer are laminated alternately to obtain the internal multilayer body. The internal electrode pattern layers are formed by any method, such as printing method and transfer method. The inner green sheets each having the internal electrode pattern layers may be laminated via adhesive layers.

The outer green sheets are formed on the carrier sheets as a support in the same manner as the inner green sheets. The outer green sheets are formed on the carrier sheets and are thereafter dried. Incidentally, the outer green sheets are sufficiently thicker than the inner green sheets.

Instead of laminating the internal multilayer body on the outer green sheets, the inner green sheets and the internal electrode pattern layers may alternately be laminated directly on the outer green sheets by a predetermined number of layers. Alternatively, multilayer body units formed by alternately laminating a plurality of inner green sheets and a plurality of internal electrode pattern layers may be prepared in advance and laminated on the outer green sheets by a predetermined number of layers.

The obtained green multilayer body is cut to a predetermined size along cutting lines, for example, to form green chips. The green chips are solidified and dried for removal of plasticizer and are thereby solidified. The solidified and dried green chips are loaded into a barrel container together with media and polishing liquid and are subjected to barrel polishing by a horizontal centrifugal barrel machine. The green chips after having been subjected to the barrel polishing are washed with water and dried.

The dried green chips are debindered, fired, and if necessary, annealed, and the capacitor element body 4 shown in FIG. 1 is thereby obtained. When the internal electrode pattern layers serving as the internal electrode layers 12 contain copper, the temperature for firing is preferably lower than 1085° C. (melting point of copper), that is, a temperature of 900° C. to 1080° C. is preferable. When the internal electrode pattern layers serving as the internal electrode layers 12 contains silver, the temperature for firing is preferably lower than 962° C. (melting point of silver), that is, a temperature of 800° C. to 960° C. is preferable.

The sintered body (element body 4) thus obtained is subjected to edge polishing by barrel polishing or so, and the terminal electrodes 6 and 8 are formed by baking the paste for terminal electrodes. If necessary, a pad layer is formed on the terminal electrodes 6 and 8 by plating or so. The paste for terminal electrode layers is prepared in the same manner as the above-described paste for internal electrode pattern layers.

The multilayer ceramic capacitor 2 manufactured in this manner is mounted on a printed board by soldering, conductive adhesive, or the like and is used for various electronic apparatuses.

In the present embodiment, the voids 20 are configured to be formed easily in the outer green sheets after firing, which will constitute the dielectric layers 11, compared to the inner green sheets, which will constitute the dielectric layers 10. For example, a content ratio of boron oxide and/or lithium oxide in the outer green sheets is larger than that in the inner green sheets. Alternatively, a binder content in the outer green sheets is larger than that in the inner green sheets.

Second Embodiment

In the present embodiment, a leading void ratio RSl is larger than a capacitance void ratio RSc, where the leading void ratio RSl is an area ratio of the voids 20 contained in the leading region Sl of the element body 4 shown in FIG. 1A, and the capacitance void ratio RSc is an area ratio of the voids 20 contained in the capacitance region Sc. That is, RSl/RSc is larger than 1 (preferably, 1.1 to 2) in the present embodiment. In this structure, heat is harder to transmit except for the capacitance region Sc, and self-repairing thereby occurs more easily. If RSl/RSc is too large, a large amount of voids is formed in the leading regions Sl, cracks are generated in the leading regions at the time of application of mechanical stress, and capacitance of capacitor may decrease.

The void ratio can be measured in a similar manner to First Embodiment. To generate a difference in void ratio, for example, different paste materials, which are for formation of print films to be the inner dielectric layers 10 by print method or so, are used in the capacitance region Sc and the leading regions Sl. That is, the paste material for formation of the leading regions Sl contains a large ratio of boron oxide and/or lithium oxide. Alternatively, the outer green sheets contain a large amount of binder compared to the inner green sheets.

Other features and effects of the present embodiment are the same as those of First Embodiment, and common matters are not explained.

Third Embodiment

In the present embodiment, a side void ratio RSs is larger than a capacitance void ratio RSc, where the side void ratio RSs is an area ratio of the voids 20 contained in the side region Ss of the element body 4 shown in FIG. 1B, and the capacitance void ratio RSc is an area ratio of the voids 20 contained in the capacitance region Sc. That is, RSs/RSc is larger than 1 (preferably, 1.1 to 2) in the present embodiment. In this structure, heat is harder to transmit except for the capacitance region Sc, and self-repairing thereby occurs more easily. If RSs/RSc is too large, a large amount of voids is formed in the side region Ss, and the capacitance region Sc may not sufficiently be protected by the side regions Ss.

The void ratio can be measured in a similar manner to First Embodiment. To generate a difference in void ratio, for example, the side regions Ss shown in FIG. 1B are formed by a paste material differing from those of the capacitance region Sc, the leading regions Sl, and the exterior regions Se shown in FIG. 1A. That is, the paste material for formation of the side regions Ss contains a large ratio of boron oxide and/or lithium oxide. Alternatively, the outer green sheets contain a large amount of binder compared to the inner green sheets.

The side regions Ss can also be formed in such a manner that a paste film for formation of the side regions Ss is applied to a side part of green chips or sintered bodies to be the element body 4 and thereafter undergoes a heat treatment. The side regions Ss may be composed of an insulator, such as glass film, resin, and oxide ceramics.

Other features and effects of the present embodiment are the same as those of First Embodiment, and common matters are not explained.

The present invention is not limited to the above-described embodiments and may variously be modified within the scope of the present invention.

For example, the multilayer ceramic electronic component of the present invention is not limited to the multilayer ceramic capacitor, but may be applied to any other multilayer ceramic electronic components in which dielectric layers are laminated via internal electrodes, such as band-pass filters, multilayer three terminal filters, piezoelectric elements, PTC thermistors, NTC thermistors, and varistors.

EXAMPLES

The present invention is described based on further detailed examples, but the present invention is not limited to these examples.

Example 1

BaTiO$_3$ powders having a grain size of 0.05 to 1 μm were initially prepared as raw material powders of a main raw material. Then, MgCO$_3$, MnCO$_3$, Y$_2$O$_3$, SiO$_2$, and B$_2$O$_3$ were prepared as sub-components. Incidentally, the sub-components were preliminarily pulverized to have a grain size of about 0.03 to 0.2 μm, which was smaller than a grain size of a raw material of barium titanate.

Next, each powder of the above-prepared sub-components was weighed so as to obtain 0.5 mol of the MgCO$_3$ powder, 0.3 mol of the MnCO$_3$ powder, 0.2 mol of the Y$_2$O$_3$ powder, and 10 mol of the B$_2$O$_3$ powder with respect to 100 mol of the main raw material. Each of these powders was wet-mixed and dried in a ball mill. Then, a dielectric raw material for the capacitance region Sc was obtained. MgCO$_3$ and MnCO$_3$, both of which were added at this time, would be contained in the dielectric layers 10 as MgO and MnO, respectively, after firing.

100 parts by weight of the obtained dielectric raw materials, 7 parts by weight of acrylic resin, 4 parts by weight of butyl benzyl phthalate (BBP) as a plasticizer, 80 parts by weight of methyl ethyl ketone as a solvent were subsequently mixed in a ball mill and turned into a paste for inner dielectric layers.

Separately from the above, 56 parts by weight of Cu particles, 40 parts by weight of terpineol, 4 parts by weight of ethyl cellulose, and 1 part by weight of benzotriazole were kneaded in a triple roll mill and turned into a paste for internal electrode layers. The average particle size of the Cu particles was 1 μm.

Moreover, a main raw material powder whose average grain size was the same as that of the dielectric particles in the capacitance region was prepared as the dielectric raw material of the exterior regions. The sub-components are wet-mixed and turned into a paste for dielectric layers in the exterior regions in a similar manner to the dielectric raw material of the capacitance region. In the paste for dielectric layers in the exterior regions Se, however, the voids 20 were configured to be formed easily after firing by increasing a binder resin content (7.1 parts by weight of acrylic resin) compared to that of the paste for dielectric layers in the capacitance region Sc.

Then, green sheets were formed on a PET film using the paste for dielectric layers prepared in the above-mentioned step. Then, green sheets were formed on a PET film using a dielectric paste for forming exterior regions. A paste for internal electrodes was screen-printed, and green sheets for interior regions were formed.

A plurality of green sheets for interior region having the internal electrode layers and green sheets for exterior regions was laminated and adhered by pressure, and a green multilayer body was obtained. Then, the green multilayer body was cut into a predetermined size to obtain green chips.

The obtained green chips were subsequently debindered, fired, and annealed with the following conditions, and multilayer ceramic fired bodies were thereby obtained.

In the debinder treatment, the temperature increase rate was 25° C./hour, the retaining temperature was 260° C., the retention time was 8 hours, and the atmosphere was air.

In the firing treatment, the temperature increase rate was 200° C./hour, the retaining temperature was 1000° C., and the retention time was 120 minutes. The cooling rate was 200° C./hour. The atmosphere gas was a humidified mixed gas of N$_2$+H$_2$, and the oxygen partial pressure was 10$^{-9}$ MPa or less.

In the annealing treatment, the temperature increase rate was 200° C./hour, the retaining temperature was 1000° C., the retention time was 10 hours, the cooling rate was 200° C./hour, and the atmosphere gas was a humidified N$_2$ gas (oxygen partial pressure: 10$^{-8}$ MPa or less).

A wetter was used to humidify the atmosphere gas during the firing and annealing.

End surfaces of the obtained multilayer ceramic fired bodies underwent a barrel polish and were thereafter applied with a Cu paste as an external electrode and baked in a reducing atmosphere. Then, obtained was a plurality of multilayer ceramic capacitor samples (hereinafter these may simply be referred to as "capacitor samples") according to Example 1. FIG. 2 shows a schematically enlarged cross-sectional view of a main part of the capacitor samples according to Example 1.

Comparative Example 1

Except that the paste for dielectric layers in the exterior regions Se was the same as the paste for dielectric layers in the capacitance region Sc and was used to form green sheets having the same thickness as those in the capacitance region Sc in terms of manufacture conditions of capacitor samples, a plurality of capacitor samples according to Comparative Example 1 was manufactured in a similar manner to Example 1.

Example 2 to Example 8

Except for changing an amount of a binder resin (amount (parts by weight) of acrylic resin) contained in the paste for dielectric layers in the exterior regions Se among manufacture conditions of the capacitor samples according to Example 1, a plurality of capacitor samples according to Example 2 to Example 8 was manufactured in a similar manner to Example 1.

Example 9

Except for using 56 parts by weight of Ag particles instead of 56 parts by weight of Cu particles, a plurality of capacitor samples according to Example 9 was manufactured in a similar manner to Example 3.

Example 10a

Except for weighing 10 mol of Li$_2$O (sub-component) to 100 mol of a main component instead of 10 mol of B$_2$O$_3$ powder, a plurality of capacitor samples according to Example 10a was manufactured in a similar manner to Example 3.

Example 10b

Except for weighing 5 mol of Li$_2$O in addition to 5 mol of B$_2$O$_3$ powder as sub-components to 100 mol of a main component, a plurality of capacitor samples according to Example 10b was manufactured in a similar manner to Example 3.

Comparative Example 2

Except for using 56 parts by weight of Ni particles instead of 56 parts by weight of Cu particles, a plurality of capacitor samples according to Comparative Example 2 was manufactured in a similar manner to Example 3.

Example 11

Except that paste materials for print films were different from each other in the capacitance region Sc and the leading regions Sl in forming a print film to be the inner dielectric layers 10 by screen print or so, and that the leading regions Sl were configured to easily have the voids 20 shown in FIG. 2 (the parts by weight of acrylic resin in the leading regions were those of Table 2), a plurality of capacitor samples according to Example 11 was manufactured in a similar manner to Example 1.

Example 12

Except that paste materials for forming print films were different from each other in the capacitance region Sc and the leading regions Sl in forming print films to be the inner dielectric layers 10 by screen print or so, and that the voids 20 shown in FIG. 2 are configured to be generated easily in the leading regions Sl (the parts by weight of acrylic resin in the leading regions were set to those shown in Table 2), a plurality of capacitor samples according to Example 12 was manufactured in a similar manner to Example 2.

Example 13

Except that paste materials for forming print films were different from each other in the capacitance region Sc and the leading regions Sl in forming print films to be the inner dielectric layers 10 by screen print or so, and that the voids 20 shown in FIG. 2 are configured to be generated easily in the leading regions Sl (the parts by weight of acrylic resin in the leading regions were set to those shoe in Table 2), a plurality of capacitor samples according to Example 13 was manufactured in a similar manner to Example 3.

Example 21

Except that paste materials for forming print films were different from each other in the side regions Ss and the capacitance region Se shown in FIG. 1E in forming print films to be the inner dielectric layers 10 by screen print or so, and that the voids 20 shown in FIG. 2 are configured to be generated easily in the side regions Ss (the parts by weight of acrylic resin in the side regions were set to those shown in Table 3), a plurality of capacitor samples according to Example 21 was manufactured in a similar manner to Example 1.

Example 22

Except that paste materials for forming print films were different from each other in the side regions Ss and the capacitance region Sc shown in FIG. 1B in forming print films to be the inner dielectric layers 10 by screen print or so, and that the voids 20 shown in FIG. 2 were configured to be generated easily in the side regions Ss (the parts by weight of acrylic resin in the side regions were set to those shown in Table 3), a plurality of capacitor samples according to Example 22 was manufactured in a similar manner to Example 2.

Example 23

Except that paste materials for forming print films were different from each other in the side regions Ss and the capacitance region Sc shown in FIG. 1B in forming print films to be the inner dielectric layers 10 by screen print or so, and that the voids 20 shown in FIG. 2 were configured to be generated easily in the side regions Ss (the parts by weight of acrylic resin in the side regions were set to those shown in Table 3), a plurality of capacitor samples according to Example 23 was manufactured in a similar manner to Example 3.

Measurement

The following measurement was carried out for the capacitor samples obtained in Comparative Examples 1 and 2 and Examples 1 to 10b, 11 to 13, and 21 to 23. The results are shown in Tables 1 to 3.

1. Measurement of Void Ratio

Each of Examples and Comparative Examples was polished on a perpendicular surface to the plane of the internal electrode layers of the multilayer ceramic capacitor samples (e.g., a cross section including the X-axis and the Z-axis, a cross section including the Y-axis and the Z-axis). Then, each fracture surface of capacitance region Sc, exterior regions Se, leading regions Sl, and side regions Ss appeared on the polished surface was enlarged and observed in nine visual views (each view: 50 μm×50 μm) by a scanning electron microscope (SEM) at 3,000 times.

Calculated was an average of cross-sectional area ratios of voids 20 in the nine visual views for each of the regions Sc, Se, Sl, and Ss (capacitance void ratio RSc, exterior void ratio RSe, leading void ratio RSl, and side void ratio RSs). Table 1 shows RSe RSc of Examples 1 to 10b and Comparative Examples 1 and 2. Incidentally, each of RSl/RSc and RSs/RSc was 1 in Examples 1 to 10b and Comparative Examples 1 and 2.

Table 2 shows RSl/RSc of Examples 11 to 13. Table 3 shows RSs RSc of Examples 21 to 23.

2. Insulation Restoration Properties (Self-Repairing Properties) Test

A plurality of capacitor samples in each of Examples and Comparative Examples was prepared and applied with voltage (1000V) to forcibly generate the short-circuit of the internal electrodes and achieve 10Ω or less. These 10 samples were prepared in each of Examples and Comparative Examples and applied with an electric current (2.5 A), and the number of samples whose insulation was restored to 10 kΩ or higher was examined. Results are shown in Table 1 to Table 3. In the item of the insulation restoration in Table 1 to Table 3, the denominator of the numerical value is the number of samples tested, and the numerator is the number of samples whose insulation was restored.

Evaluation

As shown in Comparative Example 2 of Table 1, the number of samples capable of restoring insulation was zero in electrodes containing Ni as internal electrode layers. Comparing Comparative Example 1 with Examples 1 to 10b, it was confirmed that self-repairing properties were particularly excellent when RSe/RSc was larger 1 (preferably, 1.1 to 2).

Comparing Example 1 with Examples 11 to 13, as shown in Table 2, it was confirmed that self-repairing properties were particularly excellent when RSl/RSc was 1 or more (preferably, 1.02 to 1.1).

Comparing Example 1 with Examples 21 to 23, as shown in Table 3, it was confirmed that self-repairing properties were particularly excellent when RSs/RSc was 1 or more (preferably, 1.02 to 1.1).

TABLE 1

| | Internal Electrodes | Presence of B and Li | Amount of Resin in Exterior Regions (parts by weight) | Exterior Void Ratio (Rse)/Capacitance Void Ratio (RSc) | Self-repairing |
|---|---|---|---|---|---|
| Comp. Ex. 1 | Cu | B2O3 | 7.0 | 1 | 0/10 |
| Ex. 1 | Cu | B2O3 | 7.1 | 1.02 | 7/10 |
| Ex. 2 | Cu | B2O3 | 7.2 | 1.05 | 8/10 |
| Ex. 3 | Cu | B2O3 | 7.4 | 1.1 | 10/10 |
| Ex. 4 | Cu | B2O3 | 7.6 | 1.15 | 10/10 |
| Ex. 5 | Cu | B2O3 | 8.2 | 1.3 | 10/10 |
| Ex. 6 | Cu | B2O3 | 9.0 | 1.5 | 10/10 |
| Ex. 7 | Cu | B2O3 | 10.2 | 1.8 | 10/10 |
| Ex. 8 | Cu | B2O3 | 11.0 | 2 | 10/10 |
| Ex. 9 | Ag | B2O3 | 7.4 | 1.1 | 10/10 |
| Comp. Ex. 2 | Ni | B2O3 | 7.4 | 1.1 | 0/10 |
| Ex. 10a | Cu | Li2O | 7.4 | 1.1 | 10/10 |
| Ex. 10b | Cu | Li2O + B2O3 | 7.4 | 1.1 | 10/10 |

TABLE 2

| | Internal Electrodes | Presence of B and Li | Amount of Resin in Leading Regions (parts by weight) | Leading Void Ratio (Rsl)/Capacitance Void Ratio (RSc) | Self-repairing |
|---|---|---|---|---|---|
| Ex. 1 | Cu | B2O3 | 7.0 | 1 | 7/10 |
| Ex. 11 | Cu | B2O3 | 7.1 | 1.02 | 10/10 |
| Ex. 12 | Cu | B2O3 | 7.2 | 1.05 | 10/10 |
| Ex. 13 | Cu | B2O3 | 7.4 | 1.1 | 10/10 |

TABLE 3

| | Internal Electrodes | Presence of B and Li | Amount of Resin in Side Regions (parts by weight) | Side Void Ratio (RSs)/Capacitance Void Ratio (RSc) | Self-repairing |
|---|---|---|---|---|---|
| Ex. 1 | Cu | B2O3 | 7.0 | 1 | 7/10 |
| Ex. 21 | Cu | B2O3 | 7.1 | 1.02 | 10/10 |
| Ex. 22 | Cu | B2O3 | 7.2 | 1.05 | 10/10 |
| Ex. 23 | Cu | B2O3 | 7.4 | 1.1 | 10/10 |

DESCRIPTION OF THE REFERENCE NUMERAL

2 . . . multilayer ceramic capacitor
4 . . . capacitor element body
6 . . . first terminal electrode
8 . . . second terminal electrode
10 . . . inner dielectric layer
10a . . . dielectric particle
11 . . . outer dielectric layer
12 . . . internal electrode layer
12a . . . electrode-present area
12b . . . electrode-absent area
20 . . . void
Sc . . . capacitance region
Se . . . exterior region
Sl . . . leading region

What is claimed is:

1. A multilayer ceramic electronic component comprising an element body including:
a capacitance region formed by alternately laminating inner dielectric layers and internal electrode layers, the inner dielectric layers being sandwiched between the internal electrode layers having different polarities; and
an exterior region laminated outside the capacitance region in a laminating direction and formed by outer dielectric layers without any of the internal electrode layers, wherein
the internal electrode layers contain a main component of copper and/or silver, and
an exterior void ratio (RSe) is larger than a capacitance void ratio (RSc), in which the exterior void ratio (RSe) is an area ratio of voids contained in the exterior region, and the capacitance void ratio (RSc) is an area ratio of voids contained in the capacitance region, wherein
the element body further includes a leading region formed by an insulator located between the internal electrode layers having the same polarity and led from the capacitance region, and
a leading void ratio (RSl) is larger than the capacitance void ratio (RSc), in which the leading void ratio (RSl) is an area ratio of voids contained in the leading region.

2. The mulitplayer ceramic electronic component according to claim 1, wherein RSl/RSc 1.1 to 2.

3. A multilayer ceramic electronic component comprising an element body including:
a capacitance region formed by alternately laminating inner dielectric layers and internal electrode layers, the inner dielectric layers being sandwiched between the internal electrode layers having different polarities; and
an exterior region laminated outside the capacitance region in a laminating direction and formed by outer dielectric layers without any of the internal electrode layers, wherein
the internal electrode layers contain a main component of copper and/or silver, and
an exterior void ratio (RSe) is larger than a capacitance void ratio (RSc), in which the exterior void ratio (RSe) is an area ratio of voids contained in the exterior region, and the capacitance void ratio (RSc) is an area ratio of voids contained in the capacitance region, wherein RSe/RSc is 1.1 to 2.

4. The multilayer ceramic electronic component according to claim 3, wherein
the element body further includes a side region formed by an insulator located on a side part of the capacitance region and covering side surfaces of the internal electrode layers, and
a side void ratio (RSs) is larger than the capacitance void ratio (RSc), in which the side void ratio (RSs) is an area ratio of voids contained in the side region.

5. The multilayer ceramic electronic component according to claim 3, wherein the inner dielectric layers include a main component containing barium titanate and a subcomponent containing boron oxide and/or lithium oxide.

6. The multilayer ceramic electronic component according to claim 3, wherein the internal electrode layers also contain voids.

7. A multilayer ceramic electronic component comprising an element body including:
a capacitance region formed by alternately laminating inner dielectric layers and internal electrode layers, the inner dielectric layers being sandwiched between the internal electrode layers having different polarities; and an exterior region laminated outside the capacitance region in a laminating direction and formed by outer dielectric layers without any of the internal electrode layers, wherein the internal electrode layers contain a main component of copper and/or silver, an exterior void ratio (RSe) is larger than a capacitance void ratio (RSc), in which the exterior void ratio (RSe) is an area ratio of voids contained in the exterior region, and the capacitance void ratio (RSc) is an area ratio of voids contained in the capacitance region, wherein the element body further includes a side region formed by an insulator located on a side part of the capacitance region and covering side surfaces of the internal electrode layers, and a side void ratio (RSs) is larger than the capacitance void ratio (RSc), in which the side void ratio (RSs) is an area ratio of voids contained in the side region, and RSs/RSc is 1.1 to 2.

* * * * *